L. J. Knowles,
Steam-Boiler Indicator.
No. 647. Reissued Jan. 11, 1859.
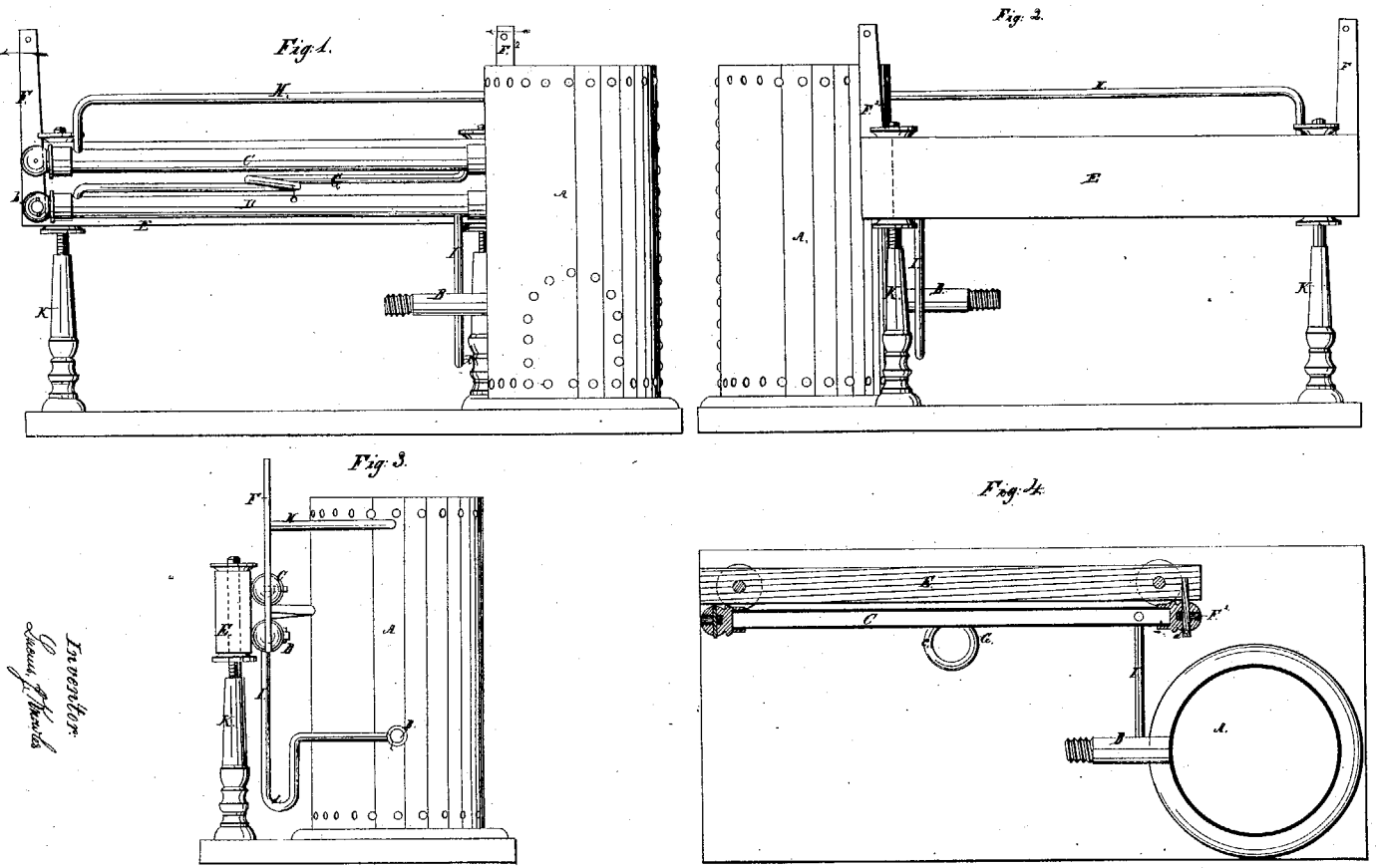
Witnesses:
M. W. Phillips
Saml. H. Ashby
Inventor:
Lucius J. Knowles
N. PETERS, PHOTO-LITHOGRAPHER, WASHINGTON, D. C.

UNITED STATES PATENT OFFICE.

LUCIUS J. KNOWLES, OF WARREN, MASSACHUSETTS.

IMPROVEMENT IN SAFETY INDICATORS FOR STEAM-BOILERS.

Specification forming part of Letters Patent No. 16,596 dated February 10, 1857; Reissue No. 530, dated February 23, 1858; Reissue No. 647, dated January 11, 1859.

*To all whom it may concern:*

Be it known that I, LUCIUS J. KNOWLES, of Warren, in the county of Worcester and State of Massachusetts, have invented a new and useful Improvement in Safety Feed Apparatus for Steam-Boilers, of which the following is a full, clear, and exact description, reference being had to the accompanying drawings, making part of this specification, in which—

Figure 1 is a front elevation of a steam-boiler to which my invention has been applied; Fig. 2, a rear view; Fig. 3, an end elevation; Fig. 4, a horizontal section through the expansion-vessel and its supporting-stand.

Steam-boiler feed-regulators have been contrived, in which by the rise or fall of the water in the boiler more or less steam was admitted to a metallic cylinder or vessel, which was thus caused to contract or expand the said vessel, being so connected with the inlet-cock of the feed-pump as to regulate the feed in accordance with the height of the water in the boiler. Such arrangement has not, however, been found to be reliable or safe, owing to the various accidental circumstances which may impede and clog the pumps. A similar device has also been proposed as a safety-indicator of the level of the water within the boiler, the expanding tube or vessel being caused to sound an alarm when the water reaches a level below which it would not be safe for it to descend. Such contrivance, however, unaccompanied by any method of regulating the feed-pumps, has been found to be of no avail, as the attendant is constantly called upon to alter his pumps as the wants of the boiler may vary.

My invention has for its object the regulation of the feed to the exact requirements of the boiler, and in connection therewith the sounding of an alarm when, from accident or from any cause whatever, the feed apparatus shall fail to do its duty; and my invention consists in the adaptation of a "tell-tale" or safety apparatus to the feed apparatus, both the feed and the safety apparatus being controlled by expansion and contraction, the safety apparatus being placed at a level below which it would not be safe for the water within the boiler to descend.

To enable others skilled in the art to understand my invention, I will proceed to describe a method of carrying it out.

In the said drawings, A is a steam-boiler; B, the feed-water pipe leading from a pump or other feeding apparatus to the boiler. E is a stand, which is supported upon the columns K, and carries two metallic expansion steam-tight vessels, C and D. One end of the vessel C is secured to the stand E by a pin, *a*, the other end being supported by a lever, F. The vessel D is supported at one end by the pin *b*, which passes into or through the stand, and at the other end it is attached to the end of a lever, $F^2$. The pin *b* is the fulcrum of the lever F and the pin *a* the fulcrum of the lever $F^2$. The vessel C is placed with its center line on or near the level at which it is desirable that the water shall stand in the boiler. The vessel D is to be placed beneath the other or at a level below which it would not be safe for the water in the boiler to descend. Between the upper part or steam-space of the boiler and the vessel C a communication is opened through the bent pipe H, and from the opposite end of this vessel to the vessel D passes the pipe G, in which are one or more turns or coil *c*. From the opposite end of the vessel D passes the bent pipe I to the feed-pipe B. As the vessel C expands, the lever F moves around its fulcrum *b* in the direction of its arrow, and it is connected with the valves or inlet cock of the feed-pump, that the amount of water fed to the boiler shall be proportionate to the expansion of the vessel C. The vessel D being firmly attached to the stand at *b* and at the other end connected with the lever $F^2$, in proportion as it expands this lever is thrown in the direction of its arrow, and it is so connected with the valve of a steam-whistle that on the vessel D expanding to a certain point, the whistle is sounded. The pipes H and G are bent or coiled to allow of the free expansion of the vessels C and D, and the pipe I is bent downward at *d*, Fig. 3, to prevent the water in the vessels C and D from being heated by any reflux from the boiler into the feed-pipe B.

Operation: The apparatus above described is so arranged that when the water is at its proper level in the boiler, the vessel or tube C shall be about half filled with water. The upper half of this vessel will then be filled with steam entering by the pipe H. If now the water rise in the boiler and in the vessel C above its proper level, this vessel will contract longitudinally, and the feed will be diminished. If, on the contrary, the level of the water in the boiler descend below its proper level, the excess of steam within the vessel C will cause it to expand and the feed will be increased. This vessel thus acts as a constant regulator to the feed, which can never fail so long as the valves and water-passages remain in order and unobstructed. A valve may, however, be raised by a chip, or the feed-apparatus may be rendered unfaithful by other slight causes, in which case the feed apparatus above described, if depended upon, would prove a source of danger instead of safety. To meet this case and to render my apparatus really a safety apparatus the vessel D is employed. Should now the feed apparatus fail to act properly and the water continue to descend until the steam reaches the vessel D, the expansion of this vessel will open the valve and sound the whistle, thus calling the attention of the engineer.

This apparatus thus combines in one an efficient feed-regulator and a watchful tell-tale, ready to give notice should the feed apparatus, from any cause, prove unfaithful. By causing the pipe I to enter the feed-pipe B it receives cool water from the pipe instead of hot water from the boiler, by which the apparatus is caused to act with more efficiency and safety than it would were the hot water of the boiler to flow into it.

It is evident that in lieu of placing the expansion-vessels C and D directly over each other and connecting the two together by the pipe G they may each be connected with the boiler by an independent set of steam and water pipes without departing from the principle of my invention. It is essential, however, that the two vessels be placed at different levels, that they may only act in succession, the uppermost one being employed to regulate the feed apparatus and the lower one to give the alarm, as described.

What I claim as my invention, and desire to secure by Letters Patent, is—

1. A feed apparatus controlled by expansion and contraction, in combination with an expansion tell-tale placed below the desired water level and above the level to which it would not be safe for the water in the boiler to descend, substantially as set forth.

2. The within-described arrangement of the vessels C and D as applied and connected with the feed-pumps and steam-whistle, for the purpose of regulating the pump and sounding an alarm, as set forth.

3. Connecting the pipe I with the boiler by means of the feed-pipe B as set forth, for the purpose described.

Witnesses: L. J. KNOWLES.

SAM. COOPER,

P. E. TESCHEMACHER.